United States Patent
Baier (10) Patent No.: US 8,188,409 B2
(45) Date of Patent: May 29, 2012

(54) TEMPERATURE PROBE FOR AN OVEN, OVEN AND METHOD FOR OPERATING AN OVEN

(75) Inventor: Martin Baier, Ettlingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 123 days.

(21) Appl. No.: 12/567,859

(22) Filed: Sep. 28, 2009

(65) Prior Publication Data

US 2010/0012645 A1 Jan. 21, 2010

(30) Foreign Application Priority Data

Mar. 30, 2007 (DE) .......................... 10 2007 016 452
Apr. 12, 2007 (DE) .......................... 10 2007 018 245

(51) Int. Cl.
*A21B 1/00* (2006.01)
*G01K 1/08* (2006.01)

(52) U.S. Cl. ........ 219/413; 219/712; 219/710; 219/213; 219/702; 219/709; 374/155; 374/149; 340/870.16; 99/325; 99/342

(58) Field of Classification Search .................. 219/712, 219/710, 213, 713, 714, 516; 374/155, 141, 374/149; 340/870.16; 99/325, 342
See application file for complete search history.

(56) References Cited

U.S. PATENT DOCUMENTS

| 5,495,038 A | 2/1996 | Buysch et al. |
| 7,381,933 B2 * | 6/2008 | Cristiani ........................ 219/713 |
| 7,392,022 B2 | 6/2008 | Albsmeier et al. |
| 2002/0145538 A1 | 10/2002 | Bocko et al. |
| 2006/0013933 A1 | 1/2006 | Fink et al. |
| 2006/0016806 A1 | 1/2006 | Cristiani |

FOREIGN PATENT DOCUMENTS

| DE | 102 11 643 A1 | 10/2003 |
| DE | 10 2004 044 100 A1 | 3/2006 |
| DE | 10 2004 047 756 A1 | 4/2006 |
| EP | 1 221 061 B1 | 7/2002 |
| EP | 1 271 061 A2 | 1/2003 |
| EP | 1 624 724 A1 | 2/2006 |

OTHER PUBLICATIONS

International Search Report for PCT/EP2008/001886 dated Oct. 23, 2008.
German Office Action for German Application No. 10 2007 018 245.9.
International Preliminary Report for PCT/EP2008/001886 dated Nov. 19, 2009.

* cited by examiner

*Primary Examiner* — Shawntina Fuqua
(74) *Attorney, Agent, or Firm* — Alston & Bird LLP (57) ABSTRACT

The invention relates to a temperature probe for an oven, comprising in one embodiment a longitudinal housing in the form of a spit. A temperature sensor and an electronic unit are arranged in a tip and are connected at the other end to emitting means. The temperature probe comprises a thermogenerator for producing energy. The thermogenerator uses a temperature difference between a higher temperature inside the oven and a lower core temperature in a food product, such as roast, in which the temperature probe is inserted, for producing energy for operating the emitting means.

14 Claims, 3 Drawing Sheets

TEMPERATURE PROBE FOR AN OVEN, OVEN AND METHOD FOR OPERATING AN OVEN

CROSS REFERENCE TO RELATED APPLICATIONS

This application is a continuation of PCT/EP2008/001886, filed Mar. 10, 2008, which in turn claims priority to DE 10 2007 016 452.3, filed on Mar. 30, 2007 and DE 10 2007 018 245.9, filed Apr. 12, 2007, the contents of which are incorporated by reference.

FIELD OF THE INVENTION

The invention relates to a temperature probe for an oven, where said temperature probe can be inserted in the food product to be cooked, as well as to an oven comprising such a temperature probe and to a method for controlling such an oven.

BACKGROUND OF THE INVENTION

U.S. Pat. No. 5,495,038 discloses an oven with a temperature probe as the so-called roast spit. During the cooking process or during operation of the oven with a food product such as, for example, a roast, a longitudinal, spit-like temperature probe is inserted into the food product, said probe having a temperature sensor in its tip allowing it to detect the temperature of said food product. The temperature probe is connected to the oven via a cable and, by means of a transmitting device, transmits the temperature information of the temperature sensor to an oven control device. In this way, the temperature inside or in the core of the food product can be detected for an automatic program or a type of automatic process. However, it is disadvantageous in this case that such a temperature probe is tied to a cable. This publication also describes a temperature probe with a transmitter, for example, a radio frequency transmitter. A battery is provided as the power supply. However, the use of power storage devices, such as batteries or the like, for a transmitting device, is difficult in the oven because they would be destroyed with the occurring temperatures of over 200° C.

U.S. Pat. No. 7,381,933 discloses another oven comprising a temperature probe as roasting spit. Specifically, a thermogenerator is mentioned, among other things, as the energy supply for the temperature probe. However, the entire disclosure does not explain how an energy supply could be implemented with a thermogenerator.

SUMMARY

The object of the invention is to provide a previously mentioned temperature probe, a previously mentioned oven, as well as a previously mentioned method with which the disadvantages of prior art can be avoided and with which, in particular, a temperature probe that allows easier and better handling can be provided.

This object is achieved by a temperature probe displaying the features of claim 1, by an oven displaying the features as claimed herein, as well as by a method of using the probe. Advantageous and preferred embodiments of the invention are the subject matter of additional claims and will be explained in detail hereinafter. Some features of the invention will be explained only once; however, irrespective thereof, they should be applicable to each and every aspect of the invention of the temperature probe, the oven or the method.

By express reference, the wording of the claims is part of the description. Furthermore, by express reference, the wording of the priority applications DE 102007016452.3 of 30 Mar. 2007 and DE 102007018245.9 of 12 Apr. 2007, both having the same applicant, is incorporatedby reference into the present description for all that they teach.

In accordance with one embodiment of the invention, the temperature probe comprises an energy generation device for the emitting means, said energy generation being configured in such a manner that it draws or generates energy from its environment in the oven during operation of the oven. This means that sensitive power storages such as batteries or chargeable batteries can be omitted and, still, electrical power can be generated for operation of the emitting means. The energy can be generated using other energy sources that are already present in the oven, as will be explained in greater detail hereinafter. The main issue here is the new type of energy generation. Thus, it is possible with the invention to provide a wireless temperature probe that can be used in many ways and whose temperature information is wirelessly transmitted to an oven control device. Complex or expensive and potentially technically sensitive solutions such as transponders, emitting devices featuring surface-wave technology, or the like can be avoided.

In accordance with one embodiment of the invention, the temperature probe comprises an elongated housing and is configured to be inserted into a food product that is to be cooked. This is suitable, for example, for a food product such as a roast. In this way, the temperature on the inside of the food product can be detected, this being a decisive parameter for operation, in particular an automatic operation. The housing may have a tip that may be hollow in order to be able to accommodate therein components such as, first and foremost, the temperature sensor.

In accordance with an alternative embodiment of the invention, the housing or the temperature probe may be flat, in particular, disk-shaped. The temperature sensor can thus detect the temperature on a food product such as, for example, a pizza, which is not suitable for insertion of an aforementioned elongated temperature probe, and can be applied thereto, for example, by being directly placed on it. Alternatively, such a flat temperature probe can be applied to a storage mould or a baking tin or the like for the food product, in particular on the underside of said product. In this manner, too, a thermally conductive connection or a thermal contact with the food product to be cooked is possible in order to detect the temperature of said product. At the same time, this—like the application of a flat probe—presents an opportunity to provide the temperature probe inside the oven in such a manner that it can be accessible to energy generation or that it can be supplied with energy. This will be explained in detail hereinafter.

There are several possibilities to generate energy from the environment in the oven. In accordance with a first basic approach, energy can be generated in that the energy is taken from a thermal or temperature difference between a hotter region and a colder region. The hotter region may be the interior space of the oven. The colder region may be the surface or the inside of the food product to be cooked and into which the temperature probe has been inserted or with which the food product is in thermally conductive contact. This temperature difference between the hotter region and the colder region can be used for drawing energy, this being advantageously accomplished by a thermogenerator based on what is referred to as "the Seebeck effect." The energy generated as a result of this may indeed not be particularly high; however, if the emitting means do not require particularly much energy, it is sufficient.

For such a thermogenerator, a first disk of a material that is a good thermal conductor such as, for example, copper, may be arranged on the temperature probe at a location that is, in particular, at a distance from the food product and the temperature sensor, respectively. This first disk is associated with a second disk, i.e., on the side toward the food product and toward the temperature sensor, respectively. The two disks are advantageously arranged parallel to each other and at a small distance from each other on the temperature probe.

Although the two disks are connected to each other, however, advantageously, they are thermally insulated relative to other. A mechanical contact may also be accomplished via the thermogenerator. A gasket that may be provided between the two disks may act as the thermal insulation.

The second disk is in a thermally conductive contact with the region of the temperature probe that has the temperature sensor or that is inserted into the food product to be cooked or is in contact with said food product. As a result of this thermally conductive contact the second disk is cooled due to the lower temperature of the food product and, as a result of this, the contacting region of the temperature probe. Such a thermally conductive contact may comprise a type of thermally conductive rod or a thermal bridge that is as solid as possible, said thermal bridge consisting of material that is a good thermal conductor such as, for example, copper or metal in general. The thermally conductive contact may represent, preferably, a substantial portion of the cross-section of the temperature probe, for example, also the housing or a part of the housing, in particular, a housing jacket.

The thermogenerator is arranged between the first disk and the second disk. Advantageously, an intermediate space between the two disks is sealed around the thermogenerator against outside contaminants. On the inside of the housing of the temperature probe, the thermogenerator may then be connected as the energy source with the aforementioned electronic device or the emitting means. Inasmuch as some thermogenerators are relatively small, for example have a size of approximately 10 mm×10 mm, it is possible to arrange several thermogenerators next to each other between the disks.

It is considered advantageous when the first disk or thermogenerator is at a specific distance from the free end of the temperature probe, for example, a few centimeters. As a result of this, an emitting device or an antenna of the emitting means may transmit temperature information unhindered and also with the lowest required emitting power. Alternatively, a disk or a housing part may be used as the antenna.

In accordance with a different approach of generating energy, it is possible to utilize a photovoltaic effect in order to generate electrical power from the light in the oven. To this end, the light in the oven or an ambient light coming through a light-transmitting oven door may be added. For the photovoltaic effect, it may be advantageous to use a solar cell. Such a solar cell—in a manner similar as previously described for the thermogenerator—can be advantageously placed at a distance from the end that has been inserted into the food product. It is considered advantageous when the electrical properties of the solar cell are adapted to the light or the wavelength of the light that prevails in the oven. Furthermore, the orientation of the solar cell may be variable or may be aligned in such a manner that it is positioned so as to be as perpendicular as possible to a light source in the oven to attain the best-possible incident light or the highest-possible energy yield. To accomplish this, it is alternatively possible for the surface of the solar cell to be positioned in an inclined manner relative to the longitudinal axis of the temperature probe that advantageously has a straight configuration. This means that it is possible, by rotating the temperature probe about its longitudinal axis—as is easily possible when said probe is inserted in the food product—to carry out an alignment without requiring mechanically movable joints or the like.

Alternatively or additionally, a solar cell may be configured to generate radiation in the invisible wavelength range, in particular, from the thermal radiation in an oven of a radiation due to a radiant heating device of the oven. For example GaAs solar cells are suitable for this purpose. The use of stacked cells is also possible. Stacked cells may also be used for several wavelength ranges.

As mentioned, the temperature probe may comprise an electronic device for the evaluation of the temperature or the temperature sensor. Since such an electronic device may be heat-sensitive, it should be located in an end region of the food product or be close to this end region or the temperature sensor located therein. Furthermore, it is possible to configure the electronic device as a high-temperature electronic device. For this, SOI (silicon on insulator) technology is an obvious example.

Usable thermogenerators are manufactured, for example, by Mikropelt GmbH, Freiburg, Germany. At temperature differences from 10° C. to 20° C., their output may be at slightly more than 1 mW, this being potentially sufficient for appropriately configured emitting means. When selecting an appropriate photovoltaic system or solar cell, the thermal stability of up to, for example, 250° C. is also important. In this case the solar cells that are used are the same as those used in space travel.

Advantageously, the measurement of the temperature should be as close to the center, or in the core of the food product as possible, namely, in that the temperature sensor is arranged at the very front of the temperature probe end. To accomplish this, said temperature probe may advantageously have a type of tip. In another embodiment of the invention, it is also possible to provide several temperature sensors along the housing. All of said sensors are then evaluated by the electronic device in order to—so to speak—obtain a type of temperature progression from the outside toward the core of the food product, or even through said food product, or to measure a type of averaged temperature. In any event, this allows a relatively accurate determination of the core temperature as being the lowest temperature in the food product, independent of the inserting depth of the temperature probe. The evaluation of several temperature sensors by the electronic device is possible.

As previously mentioned, an electronic device can be arranged either as closely as possible to a tip of a housing and, thus, probably far inside the food product. Thus, said electronic device may be arranged as far as possible inside the food product and thus be located in a region that is cooler than the remaining oven. Alternatively, an electronic device may be arranged on the cooler disk, because this also displays a temperature that is clearly below the temperature of the interior of the oven. A particularly obvious example would be the case of a disk-like temperature probe.

An oven in accordance with one embodiment of the invention that can be operated with an aforementioned temperature probe, or that forms a functional unit with said temperature probe, comprises receiving means in order to receive temperature information emitted by the emitting means. Thus, the oven or an oven control device may receive and utilize the temperature information from the temperature sensor in the temperature probe or in the food product and then, for example, process said information as has been known from prior art. The operating frequency of the emitting means and the receiving means is favourably selected for the transmission of such temperature information. The covered range need not be particularly large because the receiving means, in particular, may also be arranged inside the oven or in an oven muffle or the like. The operating frequency may be selected in an essentially arbitrary range. Inasmuch as the emitting power of the emitting means is usually very low, hardly any radio waves exit the oven.

In another embodiment of the invention, the oven may advantageously be provided on its inside with at least one storage area for the temperature probe. Such a storage area is at least partially screened with respect to the interior of the oven and has an opening for the accommodation or for plugging-in the temperature probe. By screening with respect to the interior of the oven, a cooler temperature than in the remaining interior of the oven prevails in the storage area and, here, the temperature probe—unless it is required for operation of the oven—is stored in a manner similar to as if it were inserted in a food product, said food product also being cooler than the remaining interior of the oven. For example, such a storage area may be configured as a type of pocket on an inside wall of the interior of the oven. Alternatively, an elongated storage area away from the oven interior may extend into the housing of the oven, where it is also cooler than in the oven or in an oven muffle. Advantageously, the storage area is thermally insulated from the oven muffle. Even at high oven operating temperatures, said storage area should remain at less than 100° C. so that sensitive components or an electronic device of the temperature probe are treated gently and not destroyed. Also, brief temperature surges of up to 120° C. are permissible.

In another embodiment of the invention, the oven may comprise a detecting device at the storage area. As a result of this, it is possible to detect when the oven is being operated, regardless of whether the temperature probe—at least a front region of the temperature probe comprising the electronic device or the temperature sensor—is located in or plugged into said storage area. This detecting device may be connected to an oven control device and, during operation of the oven, prevent the oven from being heated to high temperatures when the temperature probe is not in the storage area.

Furthermore, a detecting device may be configured in such a manner that it detects when no temperature signals are emitted by the temperature sensor or by the temperature probe. In conjunction with this, there may be three cases. In the first case, the temperature probe is in the storage area, which can be detected by the detecting device; then any desired operation of the oven is possible. In the second case, the temperature probe may be inserted in a food product and, due to the temperature difference, the emitting means emit temperature information. In a third possible case neither the first nor the second case occurs. As a rule, this is a so-called error case, for example, when the temperature probe is next to a food product on the inside of the oven. Due to the lacking temperature difference, said probe cannot emit any temperature information because it cannot generate any electrical power. To this extend, it should be indicated to an operator that the temperature probe is not functional. Furthermore, the problem exists here that the temperature probe is fully exposed to the temperature of the interior of the oven and may thus overheat, this leading to the potential damage or destruction. The temperature probe must also be protected against this in that a warning signal is emitted and, advantageously, the oven cannot reach temperatures that are too high, for example, temperatures no higher than 100° C.

The detecting device may comprise a type of mechanical switch. It would be actuated by plugging the temperature probe into the storage area or by changing said switch's switching status by inserting or removing the temperature probe. Alternatively, the detecting device may comprise a proximity sensor that operates, in particular, without touch. Such a proximity sensor may be magnetically actuated, for example with a Hall sensor, for the detection of a magnet specifically provided on the temperature probe, or inductively or capacitively actuated, such proximity sensors being known to those skilled in the art.

In order to save energy, the emission of the temperature information by means of the emitting means may either occur continuously or also at certain time intervals, in particular, periodically. Furthermore, it is possible for short-term energy storage in the temperature probe to occur, for example, via a thermally stable capacitor. This means that, for a periodic operation of the emitting means, it is possible to collect energy for an extended time to be used later for a short time for emission, for example, for emission every one to 30 seconds.

In another embodiment of the invention, an oven may be configured in such a manner that several temperature probes may be operated in it. In order to distinguish between the respective temperature data, which, depending on the food product or current residence time of said food product inside the oven, can provide measurements of different temperatures, individual coding may be provided. This coding may always be emitted with the temperature information via the emitting means and be detected and differentiated by the receiving means. Thus it is also possible—by input in an oven control device—to indicate what food product, or what food product into which a temperature probe provided with an identification inserted in the food product, is finished and can thus be removed. It may also be possible to operate an oven with a spit-like temperature probe as well as with a flat, disk-like temperature probe. Consequently, depending on the food product, its optimal temperature sensor can be used, i.e., for example, a spit-like temperature sensor for roasts and a disk-like temperature sensor for pizza or the like. By using different frequency coding, it is possible for an oven control device to detect which temperature probe is currently being used and to potentially perform a correction of the emitted temperature values. Another possibility for coding may be an emission with various frequencies.

An encryption of temperature information can also be used by varying emission intervals instead of using a signal that contains the exact temperature information. For example, it is possible to emit a brief signal every five to ten seconds, this meaning a temperature of 50° C.; a temperature of 70° C. can be emitted by a brief radio signal every seven seconds, etc.

This and additional features are obvious from the description and the drawings, the individual features being implemented—by themselves or in several forms of sub-combinations—in an embodiment of the invention or in other applications and advantageous embodiments that display independent protection-worthiness and for which protection is claimed here. The division of the application into individual sections as well as the intermediate headings do not restrict the general validity of the statements presented thereunder.

BRIEF DESCRIPTION OF THE DRAWINGS

Exemplary embodiments of the invention are schematically shown in the drawings and will be explained in detail hereinafter.

DETAILED DESCRIPTION OF THE EXEMPLARY EMBODIMENTS

Figure 1:
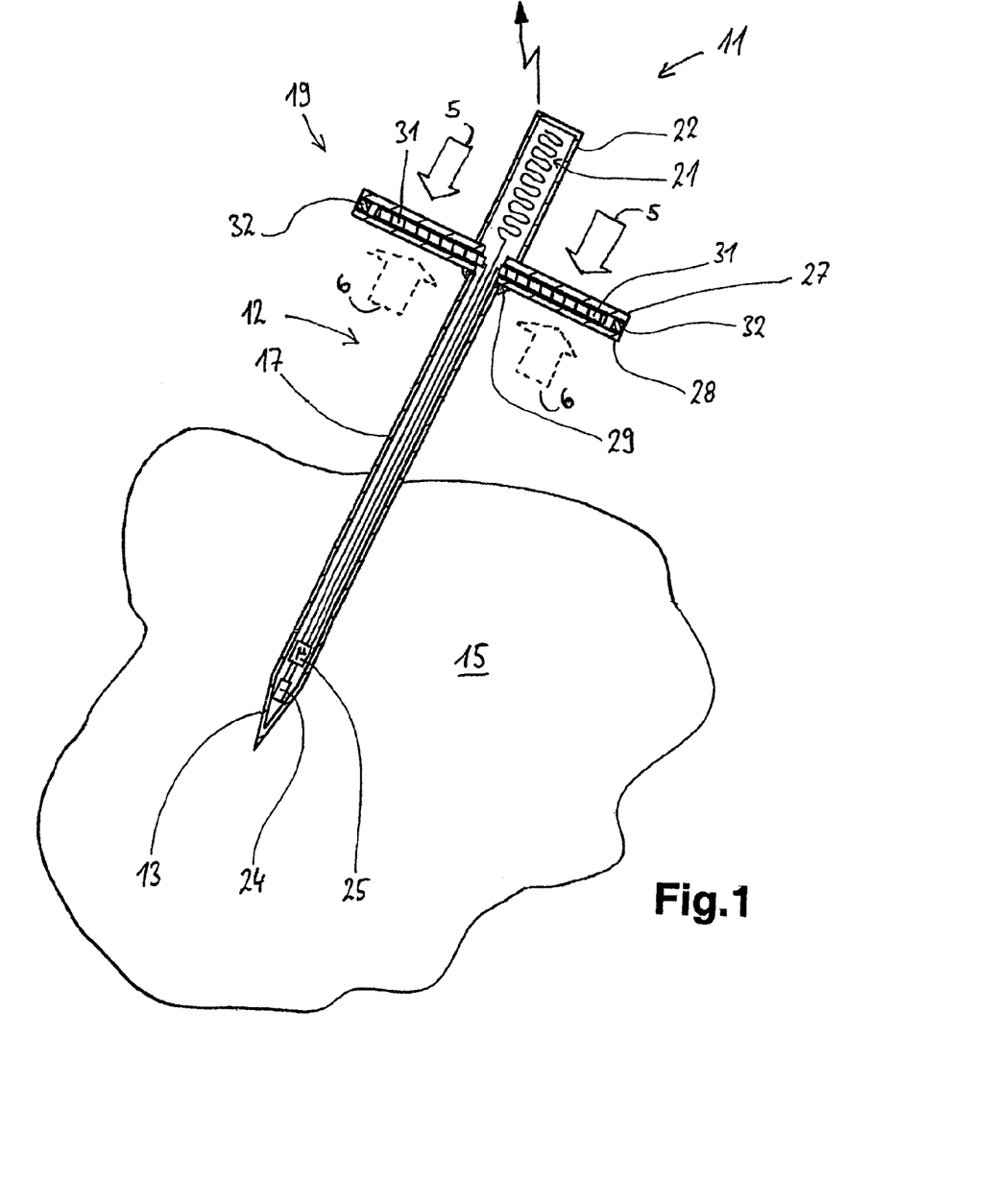
FIG. 1 illustrates a sectional view of an inventive temperature probe in accordance with a thermogenerator that is inserted in a food product to be cooked.

FIG. 1 shows a temperature probe 11 in accordance with one embodiment of the invention, said temperature probe being constructed in the manner of a so-called roast spit. The temperature probe 11 comprises a longitudinal, pipe-like housing 12 that terminates in a tip 13 toward the front. Said tip is inserted into a roast 15 that is the food product to be cooked. The housing comprises a housing jacket 17 of a metal that is suitable for the operating conditions of a roasting spit, for example, copper, for improved heat conductivity, possibly also coated, or provided with a thin stainless steel sleeve for foodstuff hygiene. A disk-shaped energy generator 19 adjoins the housing. This energy generator, in turn, has a terminal cap 22 in which the emitting means 21 are arranged—as would be an antenna or the like—in order to protect said emitting means.

A temperature sensor 24 is provided in the tip 13 of the temperature probe 11, said sensor being connected to an electronic device 25. The electronic device 25 is configured to evaluate the temperature sensor 24 and to transmit temperature information—via the connection—to the emitting means 21 or to the appropriate receiving means. The electronic device 25 is protected from excessively high temperatures because it is seated at the very front of the tip 13 when it is inserted in the roast 15; however, said electronic device is advantageously implemented with the aforementioned SOI technology, so that said device can withstand high temperatures. In the region between the tip 13 and the energy generation, it is possible to provide additional temperature sensors, as previously mentioned.

The energy generator 19 provided on the housing 12, in general, is disk-like. It comprises a first disk 27 and, parallel thereto, a second disk 28. The two disks 27 and 28 are at a small distance from each other. In this instance, both disks have the same shape, in particular they are annular disks and may consist of the same material, preferably a material that is a good thermal conductor such as copper, which may be coated or provided with stainless steel plating. The second disk is connected to the rear end of the housing 12 by means of a weld 29, where said weld 29 can act not only for mechanical fastening but must also establish the best-possible thermally conductive contact between the housing 12 and the second disk 28. To this extent, it is also possible to provide—instead of the weld 29—a type of wider flange or the like to provide the best-possible thermally conductive contact between the two parts. Toward the rear, the first disk 27 is connected to a terminal cap 22.

One thermogenerator 31 or several thermogenerators are provided between the disks 27 and 28. Toward the outside, said thermogenerator or the intermediate space formed between the disks 27 and 28 is sealed with a suitable gasket 32 for the operation of the oven. The upper side of the thermogenerator 31 is connected as well as possible or in a thermally conductive manner with the first disk 27, the latter representing the hot side. The underside of said thermogenerator is connected to the second disk 28, the latter representing the cool side.

The function of the energy generator 19 is as follows: during operation of the oven with the roast 15, into which the temperature probe 11 has been inserted, in place in the oven, the temperature sensor 24 detects the temperature on the inside of the roast 15 or the so-called core temperature. While the environment in the oven, consistent with its operation, increases, for example, to 200° C. and thus the projecting part of the temperature probe 11 is heated and, first and foremost, the first disk 27 as the hot side, the greater part of the housing 12 is in the cooler roast 15. The solid broad arrows 5 indicate the hot side. Usually, the core temperature of the roast 15 does not rise above 90° C., even with longer roasting times, so that the housing 12 displays the same temperature at least at the front of the tip 13. Due to the thermally conductive configuration of the housing jacket 17 as well as due to the best-possible thermally conductive contact 29 to the second disk 28 as the cool side, said latter disk is cooled to a certain extent as indicated by the dashed-line wide arrows 6 that are meant to represent the cool side.

Consequently, the second disk 28 is somewhat cooler than the first disk 27. As a result of this, a temperature gradient exists from the hot side of the thermogenerator 21 to the cool side, which can be used to generate electrical energy in accordance with the aforementioned Seebeck effect, and wherein this energy is then output to the electronic device 25 via conductive lines. This allows the electronic device 25 to be operated and, first and foremost, the temperature information of the temperature sensors 24 to be emitted via the emitting means 21.

Of course, numerous variations of the energy generator 19 with a thermogenerator are possible. At least the cool side of a thermogenerator could be even closer to the roast 15 in order to achieve an even greater temperature difference. Variations thereof are easily conceivable to those skilled in the art.

As an alternative to an energy generator 19 with a thermogenerator 31, solar cells could be provided on a similarly disk-shaped or planar energy generator as has been previously mentioned. In particular, such solar cells are provided instead of the first disk 27, i.e., at the side facing away from the tip 13, in order to permit good upward radiation from an oven illumination. As mentioned in the beginning, when solar cells are used, the disk-shaped energy generator 19—which is then a carrier for the solar cells—may assume an angle deviating of 90° relative to the longitudinal axis of the housing 12 in order to achieve the best-possible alignment relative to the oven illumination by rotating the temperature probe 11 about its longitudinal axis. However, this can also be easily implemented by a person skilled in the art.

Figure 2:
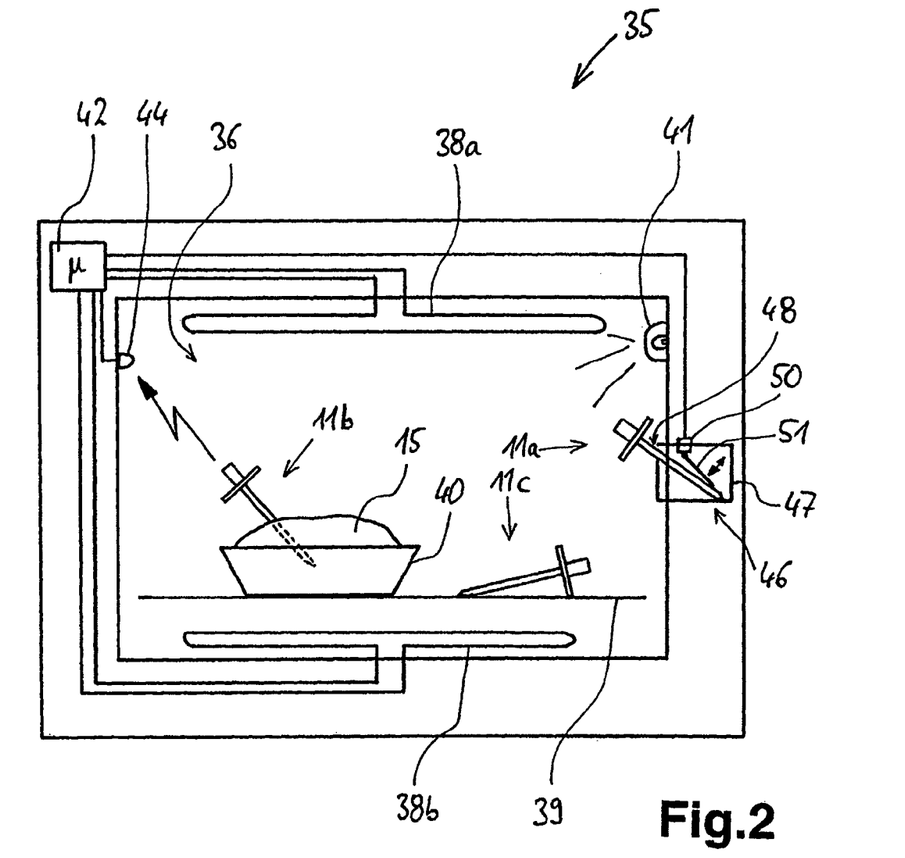
FIG. 2 illustrates a schematic sectional view of an inventive oven comprising a storage area for the temperature probe.

FIG. 2 is a sectional view of an inventive oven 35 that comprises an oven muffle 36 and that is designed as a baking oven. Located in the oven muffle 36 is an upper heater 38a and a lower heater 38b, as well as a metal carrier sheet 39 that carries a roasting mould 40 with a roast 15. Furthermore, an oven illumination 41 is provided, as is common with an appropriate thermally stable lamp. Finally, an oven control device 42 is provided, said device being connected, among other things, to the heaters 38a and 38b. Furthermore, the oven control device 42 is connected to receiving means 44 which, for example, may be arranged on the inside wall of the oven muffle 36.

Shown on the right in the oven muffle 36, there is an aforementioned storage area 46 for a temperature probe 11 with a chamber 47 that extends somewhat into the oven muffle 36 and, mostly extends therefrom. It can be accessed from the oven muffle 36 through a chamber opening 48 for the insertion of the temperature probe 11a, as illustrated. Other than that, the chamber 47—due to its design that is not illustrated in detail here, as well as due to its extension essentially outside the oven muffle 36—is configured in such a manner that a temperature in it is considerably lower than in the oven muffle 36 itself, and, advantageously does not exceed 120° C. or even only 100° C. This will be explained in detail hereinafter. Furthermore, a switch 50 comprising a switch arm 51 is provided at the chamber 47. The switch 50 and the switch arm 51 are configured in such a manner that, when the chamber 47 is empty or without the temperature probe 11, the switch arm 51 is suspended in downward direction, for example. By plugging-in the temperature probe 11a, said switch arm is deflected to the right and actuates switch 50. The oven control device 42 is electrically connected to the switch 50 and, by this means, registers the switch status of said switch and also registers if the deflection of the switch arm 51 is actuated to the left or to the right of the switches or if a temperature probe 11 has been plugged into the chamber 47.

Consequently, FIG. 2 showing the temperature probe 11a shows the initially mentioned first case, namely, that the temperature probe 11a is inserted in the chamber 47 as the storage area 46 because said probe is not needed. At the same time, it is achieved that the temperature probe 11a or an electronic device 25 contained therein is protected against temperatures that are too high by the low temperature in the chamber 47 and thus there will not be damages. The oven control device 42 detects this case via the state of actuation of the switch 50.

The initially mentioned second case, in which the temperature probe 11b is inserted into the roast 15, has the result that—due to the temperature difference described in conjunction with FIG. 1—electrical energy is generated by the thermogenerator 31 and that the temperature probe 11b emits temperature information via the emitting means 21 to the receiving means 44. The oven control device 42 receives this temperature information from the receiving means 44 and evaluates it, for example, for an automatic program for cooking the roast 15. By inserting the temperature probe 11b in the roast 15, the electronic device 25 remains below a critical temperature in this case.

The initially third mentioned case is illustrated by the temperature probe 11c. In this case the temperature probe 11c has been forgotten, as it were, or it is located on the baking tin 39. As a result of this, said probe is fully exposed to the temperature in the oven muffle 36, and said probe or the electronic device 25 could be damaged during operation due to excessive heating. This third case can be detected in that, even after a few minutes, a temperature difference on the temperature probe is missing and thus the thermogenerator cannot generate any energy for transmitting temperature information. Consequently, if no temperature information is received by the receiving means 44 and, likewise, the switch 50 has not registered an insertion of the temperature probe 11 in the storage area 46, the control device 42 will detect this as representing the third case. As it were, the third case is defined in that neither the first nor the second case is present. The oven control device 42 prevents a heating of the oven to a temperature that is detrimental to the electronic device 25. At the same time, a type of warning signal will be indicated to the operator.

Inasmuch as the third case using the temperature probe 11c cannot be implemented in the same manner in photovoltaic energy generation because the latter is not a function of a temperature difference, an alternative is required here. Advantageously, a temperature is already measured on the temperature sensor using energy that is being generated on the photovoltaic energy generator. If the temperature sensor exceeds a prespecified value of, for example 70° C. or 80° C., the oven control device switches off consistent with the proper operation. At the same time, a corresponding warning signal can be generated in that the temperature increases further, and this is a sign that the temperature probe cannot already have been inserted in a roast.

Such a temperature sensor on the temperature probe would also have the advantage that it, in general, could be used as a temperature sensor for the inside of the oven muffle 36 at a relatively central location where there normally would be the temperature sensor. To this extent, the temperature information provided by said sensor could be helpful and useful for the operation of the oven 35, in particular, when an automatic program is being used.

Figure 3:
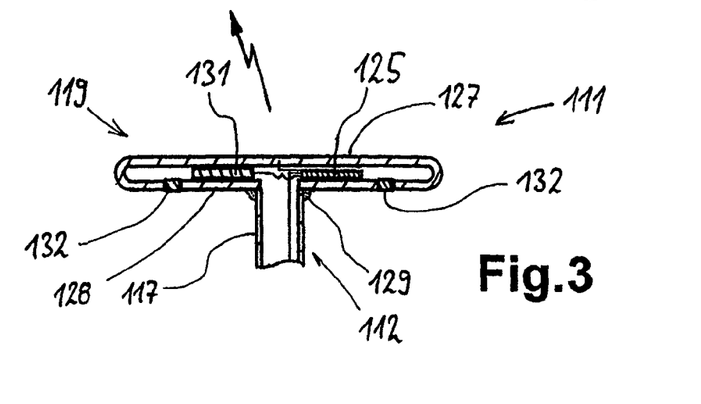
FIG. 3 illustrates a modification of the temperature probe of FIG. 1 comprising an upper disk for energy generation, said probe being bent into the plane of the lower disk.

FIG. 3 shows a part of a modification of a temperature probe 111 similar to the one of FIG. 1. However, the difference here is a first disk 127 representing the hot side is closed on its upper side and thus does not have a passage for an antenna at its rear end. On its outside edge, the first disk 127 is bent inward by 180° or crimped and extends downward for some distance. By means of a gasket 132 that is to create the best-possible thermal insulation, the seal holds a second disk 128 in place and forms therewith—similar as in FIG. 1—a housing for the energy generator 119. The second disk 128 represents the cold side.

Thermogenerators 313 are provided between the disks 127 and 128, i.e., distributed around a lower opening in the second disk 128 that, similar to FIG. 1, is connected to a tube-type housing jacket 117 by means of a weld 129. Furthermore, the electronic device 125 is mounted to the second disk 128 that is cooler than the first one and, as a rule, is sufficiently cool to avoid damaging the electronic device 125.

The surface of the first disk 127 is highly enlarged in comparison with FIG. 1, i.e., almost doubled. This permits a better and more rapid heating of the first disk 127 to an oven temperature. The second disk 128 is reduced in size, which, in turn, decreases the influence of the oven temperature on said disk being the cold side, and thus said disk remains even cooler. Consequently, due to the configuration of the two disks 127 and 128, an achievable temperature difference for the thermogenerators 131 is greater, and thus the energy yield is better.

Figure 4:
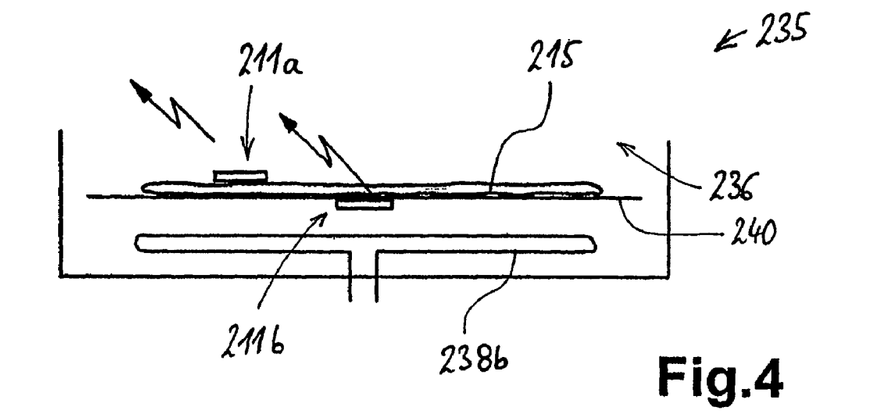
FIG. 4 illustrates a modification of the inventive oven similar to FIG. 2, with disk-like temperature probes.

In a second embodiment of the invention in accordance with FIG. 4, a disk-like temperature probe 211 is provided in an oven 235. Above a lower heater 238b, a baking tin 240 holds a pizza 215 as the food product. The lower heater 238b as well as the not illustrated upper heater of the baking tin 235 heat the interior 236 as is usual when baking a pizza.

Inasmuch as a spit-like temperature probe similar to FIG. 1 could not be inserted in a food product such as, for example, the pizza 215, in this case the above-described disk-like temperature probes 211a or 211b are provided. The underside of the temperature probe 211a, said side corresponding to a cold side, is placed directly on the pizza. The temperature probe 211b that is fastened from the bottom to the baking tin 240 is arranged with its cold side up, i.e., toward the pizza 215. An arrangement of a temperature probe 211b on the underside of the baking tin 240 may be done either by a mechanical holder in any form or by a magnetic holder. Alternatively, a temperature probe may also be an integral part of a baking tin or be installed therein.

Figure 5:
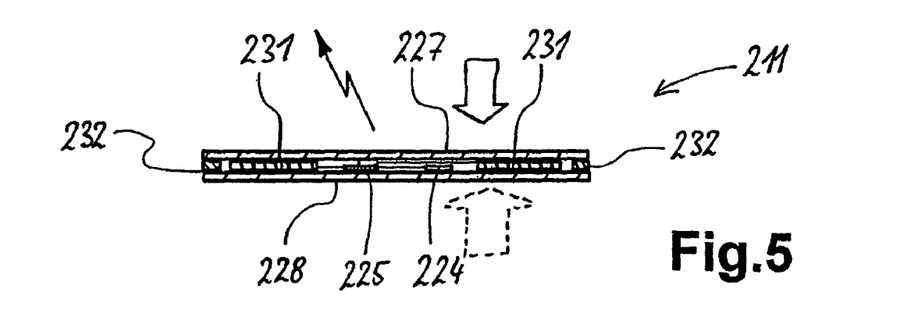
FIG. 5 illustrates an enlarged sectional view of a disk-shaped temperature probe similar to FIG. 4.

FIG. 5 shows a design of such a disk-like temperature probe 211. A first disk 227 represents the hot side. Similar as in FIG. 1, it is connected to a second disk 228 via gaskets 232, said second disk representing a cold side. Two or even more thermogenerators 231 are arranged between the disks, said thermogenerators being connected to an electronic device 225 for energy supply. Furthermore, the electronic device 225 also comprises an emitting device and is connected to the first disk 227 as the antenna.

FIG. 5, similar to FIG. 1, shows in solid lines and dashed lines the arrows for the effect of heat on the hot side of the first disk 227 and a cooling of the cold side of the second disk 228 by putting the pizza 215 in place. Indeed, it must be assumed that a temperature difference may be smaller than with a spit-like temperature probe that needs to be inserted. However, cooling still exists through the planar placement of the temperature probe 211 on the pizza 215.

Due to the fact that the electronic device 225 is arranged on the second disk 228 as in FIG. 3 and is at a slight distance from the first disk 227, said second disk remains cool. In certain situations it may also become necessary to use a thermally stable electronic device as has been mentioned. By applying the temperature sensor 224 to the second device 228, which is directly thermally coupled with the pizza or indirectly via the tin 240, said sensor is able to detect the temperature of the latter relatively accurately. In certain situations, corrective factors may be used here in the electronic device 225 or in an oven control device.

FIG. 4 also shows that, at least with the arrangement of a temperature probe 211a on top of the pizza 215, an energy generation could also occur via a previously described photovoltaic system, wherein, then, with the temperature probe 211 in accordance with FIG. 5, the first disk 227 comprises appropriately applied solar cells. Furthermore, it is possible to send temperature information in an upward direction away from the baking tin 240. For a temperature probe 211b under the baking tin 240, a special baking tin that does not hinder the sending of temperature information must be provided. Alternatively, another receiver may be provided underneath the baking tin 240 in the oven 235. For a temperature probe 211b or its arrangement underneath the baking tin 240, the use of a photovoltaic energy generation is less advantageous.

Finally, it is possible to operate various types of temperature probes in one oven, i.e., spit-like temperature probes 11 in accordance with FIG. 2 for insertion in the food product as well as flat or disk-like temperature probes 211 in accordance with FIG. 4 for placement on top. These may be distinguished from each other via a coding of their radio signals or temperature information, and the oven can automatically adjust itself thereto by means of its oven control.

The invention claimed is:

1. A temperature probe for an oven for detecting a temperature of a food product to be cooked in said oven, comprising:
   a housing with a temperature sensor for detecting said temperature of said food product contacting said temperature probe;
   an emitter configured to transmit temperature information about said temperature detected by said temperature sensor;
   a receiver configured to receive said temperature information and located in said oven, wherein said temperature probe includes a thermogenerator configured to generate energy for said emitter from energy from an environment in said oven while said oven is being operated;
   wherein said energy generation is configured so as to draw energy from a temperature difference between an interior of said oven and a region of said temperature probe in thermally conductive contact with said food product, wherein said interior of said oven is a hotter region relative to a region of said temperature probe in contact with said food product,
   wherein said temperature probe comprises an elongated temperature probe having a first end where said temperature sensor is located and a second end, wherein a first disk of a material that is a good thermal conductor is associated with a second disk closer toward said temperature sensor, said second disk being arranged at a small distance and parallel thereto on said temperature probe, wherein said second disk is in thermally conductive contact with a region of said temperature probe with said temperature sensor toward said food product in order to cool said second disk due to said lower temperature of said region of said temperature probe in or on said food product.

2. The temperature probe in accordance with claim 1, wherein said housing is elongated to facilitate insertion of said temperature probe with said temperature sensor into said food product that is to be cooked for detecting said temperature of said food product on an inside of said food product.

3. The temperature probe in accordance with claim 2, wherein said temperature sensor is located on an end of said elongated housing of said temperature probe, wherein said end is configured to be inserted into said food product.

4. The temperature probe in accordance with claim 1, wherein said housing is flat for application of said temperature probe with said temperature sensor to said food product, by placement of said probe on top of said food product, or by application of said temperature probe to a baking pan, on which said food product is located.

5. The temperature probe in accordance with claim 4, wherein said temperature sensor is arranged in a region of said temperature probe that is to be applied to said food product.

6. The temperature probe in accordance with claim 1, wherein said thermally conductive contact comprises a thermally conductive rod of material that is a good thermal conductor, wherein said thermally conductive contact represents a substantial portion of a cross-section of said temperature probe.

7. The temperature probe in accordance with claim 6, wherein said thermogenerator is arranged between said first disk and said second disk.

8. The temperature probe in accordance with claim 1, wherein said temperature sensor comprises an electronic device for evaluating said temperature, said sensor being arranged in an end region that is to contact said food product or close to said temperature sensor, wherein said sensor is configured as a high-temperature electronic device based on SOI technology.

9. An oven comprising:
   at least one said temperature probe, wherein said temperature probe comprises a housing with a temperature sensor for detecting said temperature of said food product when contacting said temperature probe with said food product, and
      an emitter configured to transmit temperature information about said temperature detected by said temperature sensor;
   a receiver located in said oven configured to receive said temperature information from said emitter;
   an oven control device configured to receive said temperature information from said receiver and use said temperature information to control a heating element of said oven; and a storage area inside said oven for storing said temperature probe, wherein said storage area is at least partially screened relative to said inside of said oven, said storage area having an opening for plugging-in said temperature probe.

10. The oven in accordance with claim 9, wherein said storage area is configured in such a manner that its interior space that is screened relative to said inside of said oven and is cooler than said inside of said oven while said oven is being operated.

11. The oven in accordance with claim 9, wherein, said storage area comprises a detecting device detecting if said temperature probe or at least a part of said temperature probe is located in said storage area, wherein said detecting device is connected to said oven control device for a case in which said temperature probe is not in said storage area or does not transmit temperature signals from said temperature sensor.

12. The oven in accordance with claim 11, wherein said detecting device comprises a mechanical switch that is configured to be actuated when said temperature probe is located in said storage are or wherein said oven control device is configured to display a different switching state than when said temperature probe is removed.

13. The oven in accordance with claim 11, wherein said detecting device comprises a proximity sensor for detecting presence of said temperature probe in said storage area in a contactless manner.

14. A method for operating an oven comprising a temperature probe, wherein said temperature probe comprises a housing with a temperature sensor for detecting a temperature of a food product contacting said temperature probe and an emitter configured to wirelessly transmit temperature information about said temperature detected by said temperature sensor, wherein said temperature probe is configured to generate energy for said emitter from energy from an environment in said oven while said oven is being operated, said oven further comprising a receiver configured to receive said temperature information and an oven control device receiving said temperature information, said method comprising the steps of:
- determining by said oven control device whether said temperature probe is located in a storage area within said oven, and if so located, then operating the oven as indicated by a user;
- determining by said over control device whether said temperature probe is in thermal contact with said food product to be cooked and emitting temperature information, and if so, then operating the oven as indicated by said user; and
- determining by said oven control device that said temperature probe is not located in said storage area and is not in thermal contact with said food, and then operating said oven to no more than 120° C.

* * * * *